United States Patent
Conradt

(10) Patent No.: US 9,471,839 B2
(45) Date of Patent: Oct. 18, 2016

(54) VEHICLE IDENTIFICATION BASED ON AN IMAGE

(71) Applicant: eBay Inc., San Jose, CA (US)

(72) Inventor: Jonathan Leonard Conradt, Mercer Island, WA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 14/964,999

(22) Filed: Dec. 10, 2015

(65) Prior Publication Data

US 2016/0098607 A1 Apr. 7, 2016

Related U.S. Application Data

(63) Continuation of application No. 14/558,600, filed on Dec. 2, 2014, now Pat. No. 9,213,918, which is a continuation of application No. 14/307,343, filed on Jun. 17, 2014, now Pat. No. 8,929,606, which is a continuation of application No. 13/677,130, filed on Nov. 14, 2012, now Pat. No. 8,798,324.

(51) Int. Cl.
*G06K 9/00* (2006.01)
*G06K 9/20* (2006.01)
*G06K 9/46* (2006.01)
(Continued)

(52) U.S. Cl.
CPC .............. *G06K 9/00832* (2013.01); *G06K 9/00* (2013.01); *G06K 9/20* (2013.01); *G06K 9/46* (2013.01); *G06K 9/4604* (2013.01); *G06K 9/6202* (2013.01); *G06K 9/6267* (2013.01); *G06T 7/0042* (2013.01); *G06K 2209/03* (2013.01);
(Continued)

(58) Field of Classification Search
USPC ....... 382/100, 103, 106–107, 156, 162, 168, 382/173, 181, 206, 209, 219, 224, 232, 254, 382/274, 276, 286, 291, 305, 105, 104, 312, 382/190; 455/418; 705/26.1, 306; 701/29.6, 701/1
See application file for complete search history.

(56) References Cited

U.S. PATENT DOCUMENTS 8,650,093 B2 * 2/2014 Seergy .................. G06Q 30/06
705/26.1
8,798,324 B2 8/2014 Conradt
(Continued)

OTHER PUBLICATIONS

U.S. Appl. No. 13/677,130, Notice of Allowance mailed Mar. 28, 2014, 15 pgs.
(Continued)

*Primary Examiner* — Seyed Azarian
(74) *Attorney, Agent, or Firm* — Schwegman, Lundberg & Woessner, P.A.

(57) ABSTRACT

A machine may be configured as a vehicle identification machine to identify a model of a vehicle based on an image that depicts a dashboard of the vehicle. As configured, the machine may receive an image of the dashboard, where the image depicts a layout of instrumentation within the dashboard. The machine may identify the layout of instrumentation by processing the image. For example, the machine may process the image by determining a position of an instrument within the layout of instrumentation, determining an outline of instrument, or both. The machine may access a data record that correlates a model of the vehicle with the identified layout of instrumentation and, based on the data record, identify the model of the vehicle. The machine may then provide a notification that references the vehicle, references the identified model of the vehicle, or references both.

14 Claims, 10 Drawing Sheets

(51) Int. Cl.
*G06K 9/62* (2006.01)
*G06T 7/00* (2006.01)
*G01M 17/00* (2006.01)
*G06Q 30/00* (2012.01)
*G06Q 10/00* (2012.01)

(52) U.S. Cl.
CPC .............. *G06Q 10/00* (2013.01); *G06Q 30/00* (2013.01); *G06T 2207/30268* (2013.01)

(56) References Cited

U.S. PATENT DOCUMENTS

| | | | |
|---|---|---|---|
| 8,929,606 B2 | 1/2015 | Conradt | |
| 9,213,918 B2 | 12/2015 | Conradt | |
| 2003/0200151 A1* | 10/2003 | Ellenson | G06Q 30/0278 705/306 |
| 2012/0214463 A1* | 8/2012 | Smith | H04M 1/72577 455/418 |
| 2013/0144482 A1* | 6/2013 | Tuukkanen | G06F 3/0482 701/29.6 |
| 2013/0345896 A1* | 12/2013 | Blumer | G06K 9/00624 701/1 |
| 2014/0133706 A1 | 5/2014 | Conradt | |
| 2014/0294242 A1 | 10/2014 | Conradt | |
| 2015/0086081 A1 | 3/2015 | Conradt | |

OTHER PUBLICATIONS

U.S. Appl. No. 14/307,343, Notice of Allowance mailed Sep. 2, 2014, 14 pgs.
U.S. Appl. No. 14/307,343, Preliminary Amendment filed Jun. 19, 2014, 10 pgs.
U.S. Appl. No. 14/558,600, Non Final Office Action mailed Jan. 16, 2015, 9 pgs.
U.S. Appl. No. 14/558,600, Notice of Allowance mailed Aug. 10, 2015, 13 pgs.
U.S. Appl. No. 14/558,600, Response filed Jul. 15, 2015 to Non-Final Office Action mailed Jan. 16, 2015, 12 pgs.

* cited by examiner

400

Data Record
(e.g., first data record)

115

410

Layout
(e.g., model of layout, defining outlines of instruments)

412

Position
(e.g., of instrument or its outline)

420

Model
(e.g., identifier or reference to identifier of model of vehicle)

430

Year
(e.g., identifier or reference to identifier of year of vehicle)

Image (e.g., photograph of front or rear of vehicle, taken by device)

502
License Number

550

Image (e.g., photograph of windshield of vehicle, taken by device)

552
Vehicle Identification Number (VIN)

Data Record
(e.g., second data record or further data record)

610

License Number

(e.g., government issued license plate number that identifies individual vehicle)

620

Vehicle Identification Number (VIN)

(e.g., manufacturer generated alphanumeric identifier that identifies individual vehicle)

*FIG. 6*

VEHICLE IDENTIFICATION BASED ON AN IMAGE

RELATED APPLICATION

This application is a continuation of U.S. patent application Ser. No. 14/558,600, filed Dec. 2, 2014, which is a continuation of U.S. patent application Ser. No. 14/307,343, filed on Jun. 17, 2014, which is a continuation of U.S. patent application Ser. No. 13/677,130, filed on Nov. 14, 2012, the benefit of priority of which is claimed hereby, and is incorporated herein by reference in its entirety.

TECHNICAL FIELD

The subject matter disclosed herein generally relates to the processing of data. Specifically, the present disclosure addresses systems and methods to facilitate vehicle identification based on an image.

BACKGROUND

A machine (e.g., a server machine) within a network-based system may be used to communicate information about various products and services available for sale. Examples of network-based systems include commerce systems (e.g., shopping websites or auction websites), publication systems (e.g., classified advertisement websites), listing systems (e.g., wish list websites or gift registries), transaction systems (e.g., payment websites), and social network systems (e.g., Facebook®, Twitter®, or LinkedIn®). A product may be manufactured by a manufacturer and available for purchase from a seller, who may use a network-based system to merchandise the product in general or one or more specimens thereof. A potential buyer may seek information (e.g., from the network-based system) regarding the product in general or one or more specimens thereof. As an example, a product may be a model of vehicle (e.g., an automobile, a boat, or an airplane), and an individual vehicle may be a specimen (e.g., an instance) of the model of vehicle.

BRIEF DESCRIPTION OF THE DRAWINGS

Some embodiments are illustrated by way of example and not limitation in the figures of the accompanying drawings.

FIG. 4 is a block diagram illustrating a data record suitable for vehicle identification based on an image, according to some example embodiments.

FIG. 5 is a diagram illustrating additional (e.g., further) images that may facilitate vehicle identification, according to some example embodiments.

FIG. 6 is a block diagram illustrating an additional (e.g., further) data record that may facilitate vehicle identification, according to some example embodiments.

DETAILED DESCRIPTION

Example methods and systems are directed to vehicle identification based on an image. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A machine may be configured as a vehicle identification machine (e.g., by instructions in the form of software modules) to identify a model of a vehicle based on an image that depicts a dashboard of the vehicle. For many models of vehicles, the dashboard of a vehicle is analogous to a face of a person, at least in the sense that the dashboard of the vehicle may identify the manufacturer (e.g., maker or "make") of the vehicle, the model of the vehicle, and a year or range of years in which the vehicle was manufactured. Configured as a vehicle identification machine, the machine may receive an image of a dashboard of a vehicle, where the image depicts a layout of instrumentation within the dashboard. The machine may identify the layout of instrumentation by processing the image (e.g., segmenting the image and then determining a position of an instrument within the layout of instrumentation, determining an outline of instrument, or both). The machine may access a data record that correlates a model of the vehicle with the identified layout of instrumentation and, based on the data record, identify the model of the vehicle. The machine may then provide a notification that references the vehicle, references the identified model of the vehicle, or references both. This notification may be provided in response to receiving the image of the dashboard for the vehicle. Additional features of various example embodiments of the machine are described below.

Figure 1:
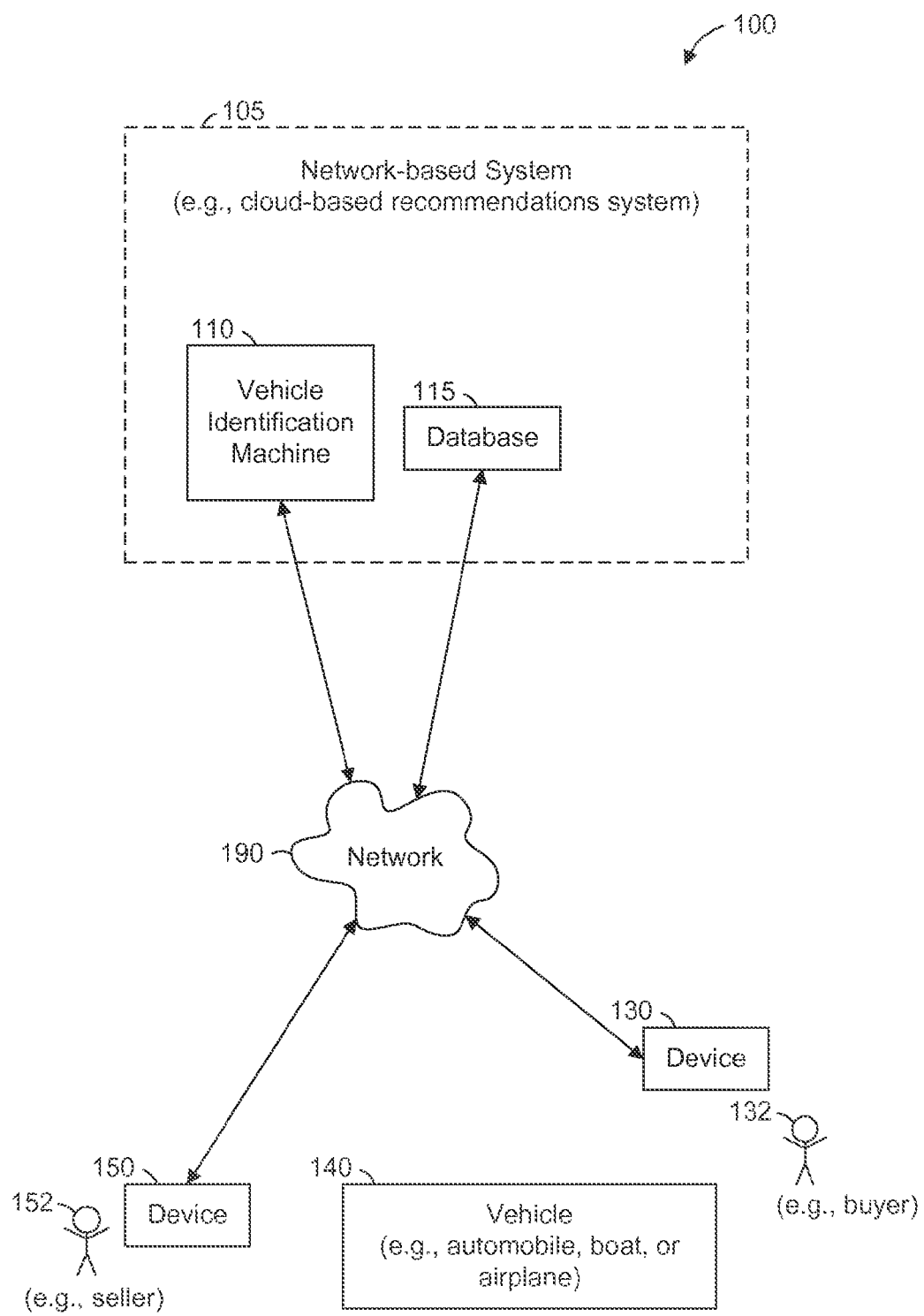
FIG. 1 is a network diagram illustrating a network environment suitable for vehicle identification based on an image, according to some example embodiments.

FIG. 1 is a network diagram illustrating a network environment 100 suitable for vehicle identification based on an image, according to some example embodiments. The network environment 100 includes a vehicle identification machine 110, a database 115, and devices 130 and 150, all communicatively coupled to each other via a network 190. The vehicle identification machine 110, the database 115, and the devices 130 and 150 may each be implemented in a computer system, in whole or in part, as described below with respect to FIG. 10. As shown, the vehicle identification machine 110 and the database 115 may form all or part of a network-based system 105, which may, in some example embodiments, form all or part of a cloud-based recommendations system (e.g., within a commerce system, a publication system, listing system, transaction system, social network system, or any suitable combination thereof).

A vehicle 140 is also shown in FIG. 1. The vehicle 140 may be an automobile (e.g., car), a boat, airplane, or any other transportation device that has a dashboard. As used herein, a "dashboard" of a vehicle (e.g., vehicle 140) refers to a panel that contains one or more instruments (e.g., gauges, meters, or indicators) that are presented to an operator (e.g., driver or pilot) of the vehicle. As used herein, such a panel need not extend completely across an interior side (e.g., interior front side) of the vehicle. Rather, a dashboard may be an instrument panel that is positioned substantially in front of, or next to, a seat from which the operator operates the vehicle (e.g., below a windshield of the vehicle), regardless of any additional seats (e.g., for passengers) in the vehicle. The vehicle may be representative of a particular model of a vehicle (e.g., a manufacturer's product line, such as "Civic" made by Honda Motors Company or "Escalade" manufactured by General Motors Company), and the model of a vehicle may be identified from the visual appearance of its dashboard.

Also shown in FIG. 1 are users 132 and 152. According to various example embodiments, the user 132 may be a buyer or potential buyer that is interested in a vehicle (e.g., vehicle 140) listed for sale (e.g., listed for sale within a listing published by the network-based system 105), and the user 152 may be a seller that listed the vehicle for sale (e.g., via the network-based system 105).

One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 10. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the vehicle identification machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof.

Figure 2:
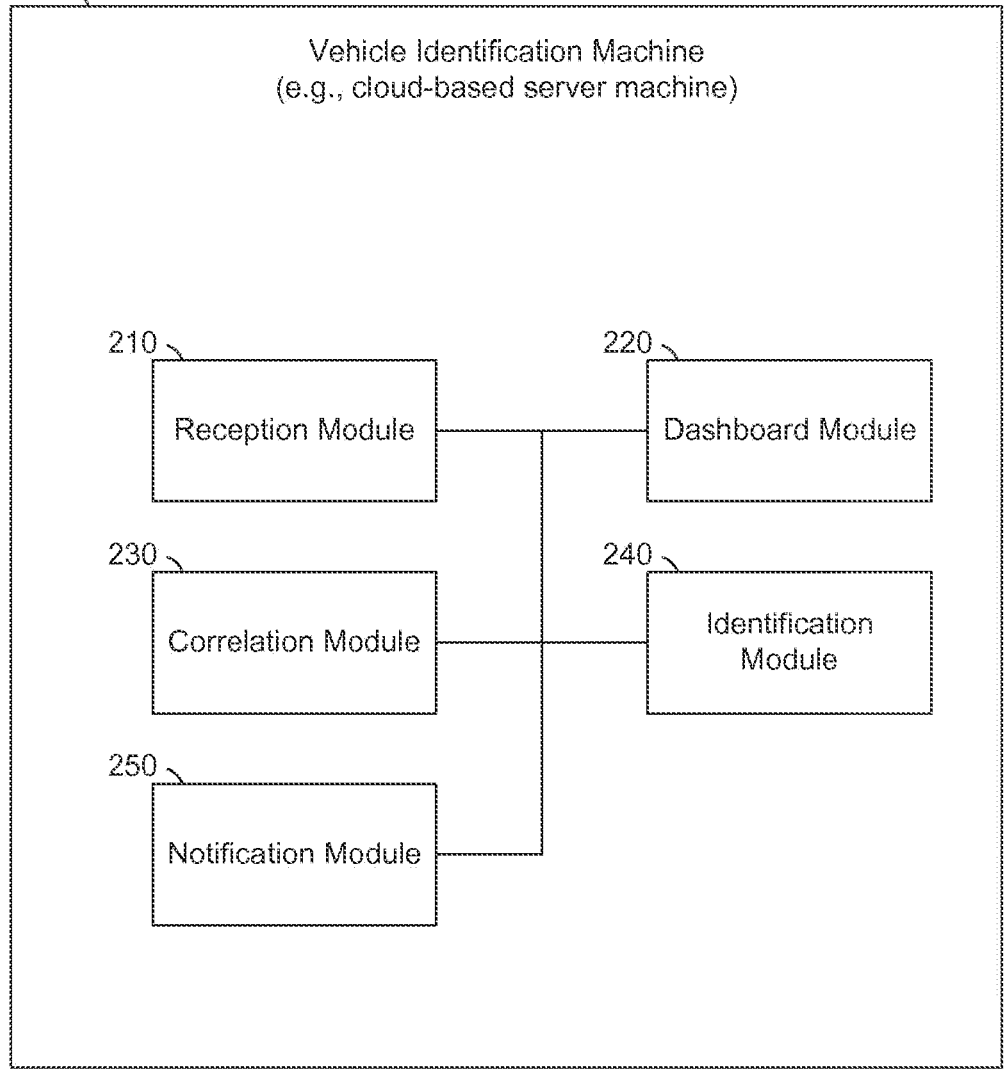
FIG. 2 is a block diagram illustrating components of a vehicle identification machine suitable for vehicle identification based on an image, according to some example embodiments.

FIG. 2 is a block diagram illustrating components of the vehicle identification machine 110, according to some example embodiments. As described in FIG. 2, the vehicle identification machine 110 may be configured as a cloud-based server machine. The vehicle identification machine 110 is shown as including a reception module 210, a dashboard module 220, a correlation module 230, an identification module 240, and a notification module 250, all configured to communicate with each other (e.g., via a bus, shared memory, or a switch). Functions of these modules are described below with respect to FIG. 7-9.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
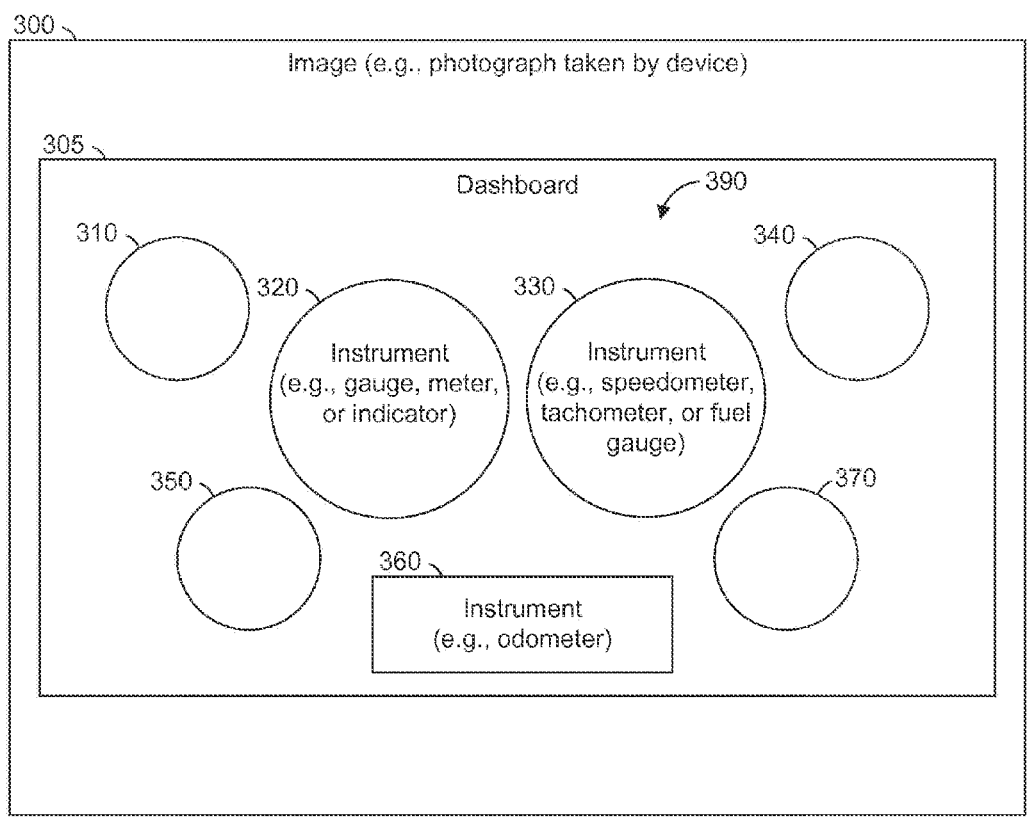
FIG. 3 is a diagram illustrating an image suitable for vehicle identification, according to some example embodiments.

FIG. 3 is a diagram illustrating an image 300 that is suitable for vehicle identification, according to some example embodiments. The image 300 may be a photograph (e.g., taken by a camera within, or connected to, the device 130) a video frame (e.g., among multiple video frames taken by video camera within, or connected to, the device 130), or a drawing (e.g., hand-drawn by the user 132 using the device 130). Accordingly, the user 132 may generate the image 300 by using the device 130 (e.g., a camera within the device 130) to capture or draw the image 300. For example, the user 132 may point the camera of the device 130 at a portion of the vehicle 140 and generate the image 300 by taking a photograph of that portion of the vehicle 140.

As shown in FIG. 3, the image 300 depicts (e.g., illustrates or shows) a dashboard 305 of the vehicle 140. Within the dashboard 305 is a layout 390 of instrumentation. Accordingly, the image 300 depicts the layout 390 of instrumentation within the dashboard 305 of the vehicle 140.

In particular, the image 300 depicts (e.g., within the layout 390) various instruments 310, 320, 330, 340, 350, 360, and 370. Each of the various instruments 310-370 may be a gauge, a meter, an indicator, or any suitable combination thereof. Examples of the instruments 310-370 include a speedometer, an odometer, a tachometer, a fuel gauge, a coolant temperature gauge, an oil pressure gauge, a headlight (e.g., headlamp) indicator, a turn signal (e.g., left turn signal or right turn signal) indicator, a transmission indicator, and an open door indicator (e.g., an indicator that a door or trunk of the vehicle 140 is open or not fully closed). Moreover, each of the instruments 310-370 may have a corresponding outline and position (e.g., relative to one or more other instruments) within the layout 390 of instrumentation. Hence, the layout 390 may be represented (e.g., modeled or encoded in XML or other modeling language) as a set of outlines and positions for some or all of the instruments 310-370 within the dashboard 305. As used herein, an "outline" of an instrument refers to one or more visible edges of the instrument (e.g., exterior or interior) or markings on the instrument (e.g., text, numbers, symbols, or a pattern of marks). As used herein, a "position" of the instrument refers to the instrument's location (e.g., placement) relative to the dashboard 305 (e.g., relative to one or more other instruments within the dashboard 305). In some example embodiments, the position of the instrument includes its orientation (e.g., angular or rotational attitude) within the dashboard 305.

With reference to FIG. 3, the instrument 320 may be a tachometer that has a particular outline and position within the dashboard 305. The instrument 330 may be a speedometer that has its own particular outline and position within the dashboard 305, and the instrument 360 may be an odometer with its own specific outline and position within the dashboard 305.

FIG. 4 is a block diagram illustrating a data record 400, according to some example embodiments. The data record 400 may be stored within the database 115 and is sometimes discussed herein as a "first" data record. The data record 400 includes a layout 410 of instrumentation and correlates the layout 410 with a model 420 of the vehicle 140. The layout 410 may be represented (e.g., modeled or encoded in XML or other modeling language the data record 400 as a set of outlines and positions of instruments (e.g., instruments 310-370), and the layout 410 may match (e.g., identically or perfectly, or within a threshold degree of similarity, as indicated by a calculated probability that the layouts 390 and 410 match each other) the layout 390 depicted in the image 300. Accordingly, FIG. 4 shows the layout 410 as including a position 412 (e.g., a position of the instrument 320 or a position of an outline of the instrument 320). The model 420 may be represented in the data record 400 as an identifier or a reference (e.g., a pointer, code, or link) to an identifier that identities the model 420 of the vehicle 140 (e.g., a "Civic" automobile, made by Honda Motor Company).

In some example embodiments, the data record 400 further includes a year 430 of the vehicle 140 and correlates the year 430 with the layout 410, with the model 420, or with both. The year 430 may be represented in the data record 400 as an identifier or a reference to an identifier that identifies the year 430 of the vehicle 140 (e.g., the year 2012 or the range 2010 to 2012). As an example, the year 430 may be a year (e.g., a calendar year or a model year) in which the vehicle 140 was manufactured, merchandised, imported, sold, or any suitable combination thereof.

FIG. 5 is a diagram illustrating additional (e.g., further) images 500 and 550 that may facilitate vehicle identification, according to some example embodiments. One or both of the images 500 and 550 may be a photograph (e.g., taken by a camera within, or connected to, the device 130) or a drawing (e.g., hand-drawn by the user 132 using the device 130). Accordingly, the user 132 may generate one or both of the images 500 and 550 by using the device 130 (e.g., a camera within the device 130) to capture or draw one or both of the images 500 and 550. For example, the user 132 may point the camera of the device 130 at a front or rear side of the vehicle 140 and generate the image 500 by taking a photograph of that front or rear side of the vehicle 140. As another example, the user 132 may point the camera of the device 130 at or through a windshield of the vehicle 140 and generate the image 550 by taking a photograph of or through the windshield of the vehicle 140.

As shown in FIG. 5, the image 500 depicts a license number 502 of the vehicle 140. For example, the license number 502 may be displayed on a license plate that is a attached to a front or rear side of the vehicle 140, and the image 500 may depict the front or rear side of the vehicle 140 with the license number 502 displayed on the license plate.

As shown in FIG. 5, the image 550 depicts a vehicle identification number 552 (VIN) of the vehicle 140. For example, the VIN 552 may be displayed on the vehicle 140 at a location at or near a corner of the windshield of the vehicle 140, and the image 550 may depict some or all of the windshield of the vehicle 140 with the VIN 552 being visible in the image 550.

FIG. 6 is a block diagram illustrating an additional (e.g., further) data record 600, according to some example embodiments. The data record 600 may be stored within the database 115 and is sometimes discussed herein as a "second" or "further" data record. The data record 600 includes a license number 610 of the vehicle 140 and correlates the license number 610 with a VIN 620 of the vehicle 140. The license number 610 may be a government issued license plate number (e.g., a combination of alphanumeric characters, such as letters and numbers) that identifies the vehicle 140 among multiple vehicles that are registered with a governmental entity. The VIN 620 may be a manufacturer generated identifier (e.g., another combination of alphanumeric characters, such as letters and numbers) that identifies the vehicle 140 among multiple vehicles made by the manufacturer. The license number 610 may match (e.g., identically or precisely) the license number 502 depicted in the image 500. The VIN 620 may match (e.g., identically or precisely) the VIN 552 depicted in the image 550.

Figure 7:
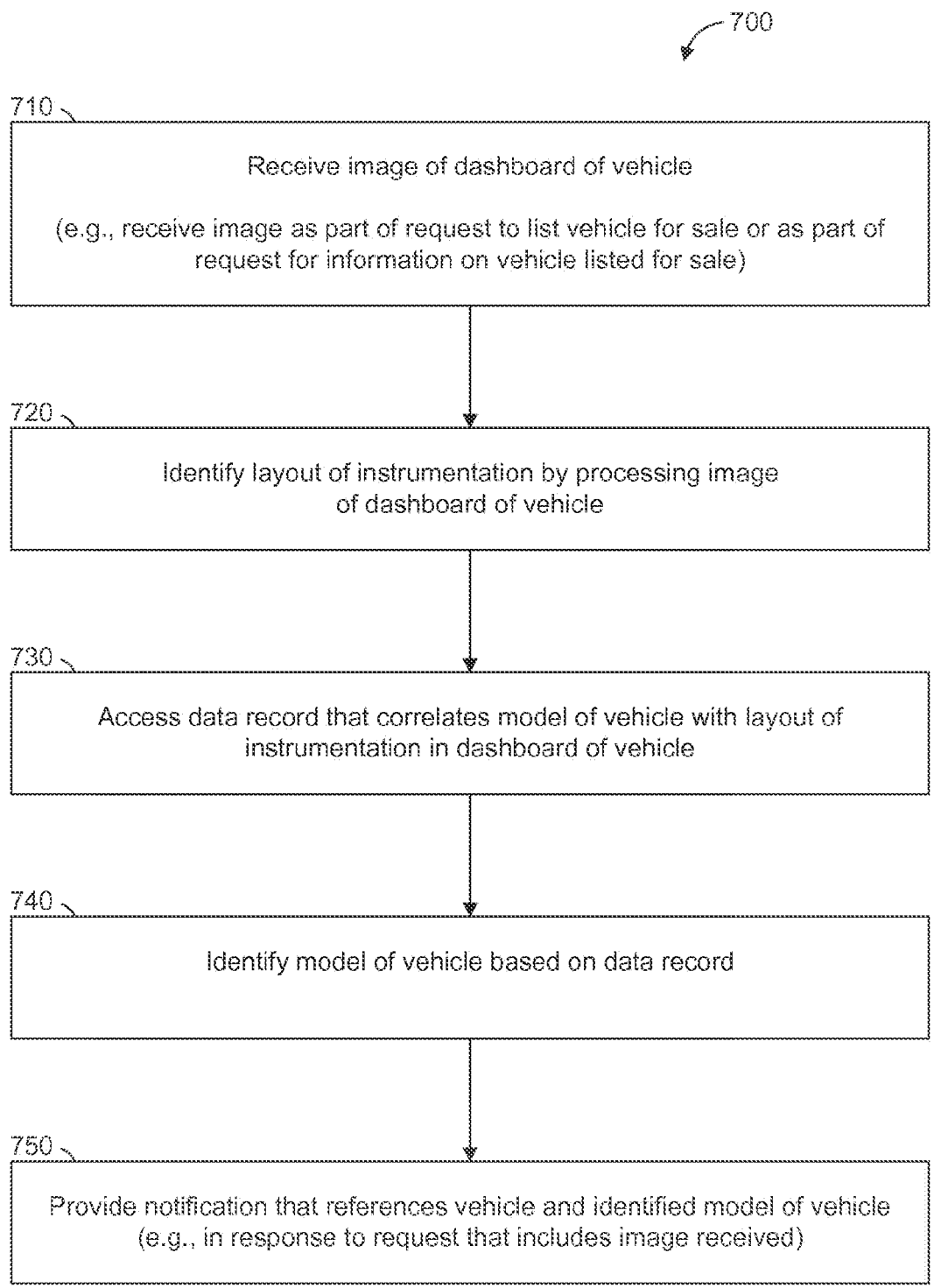
FIG. 7-9 are flowcharts illustrating operations of the vehicle identification machine in performing a method of vehicle identification, according to some example embodiments.
Figure 8:
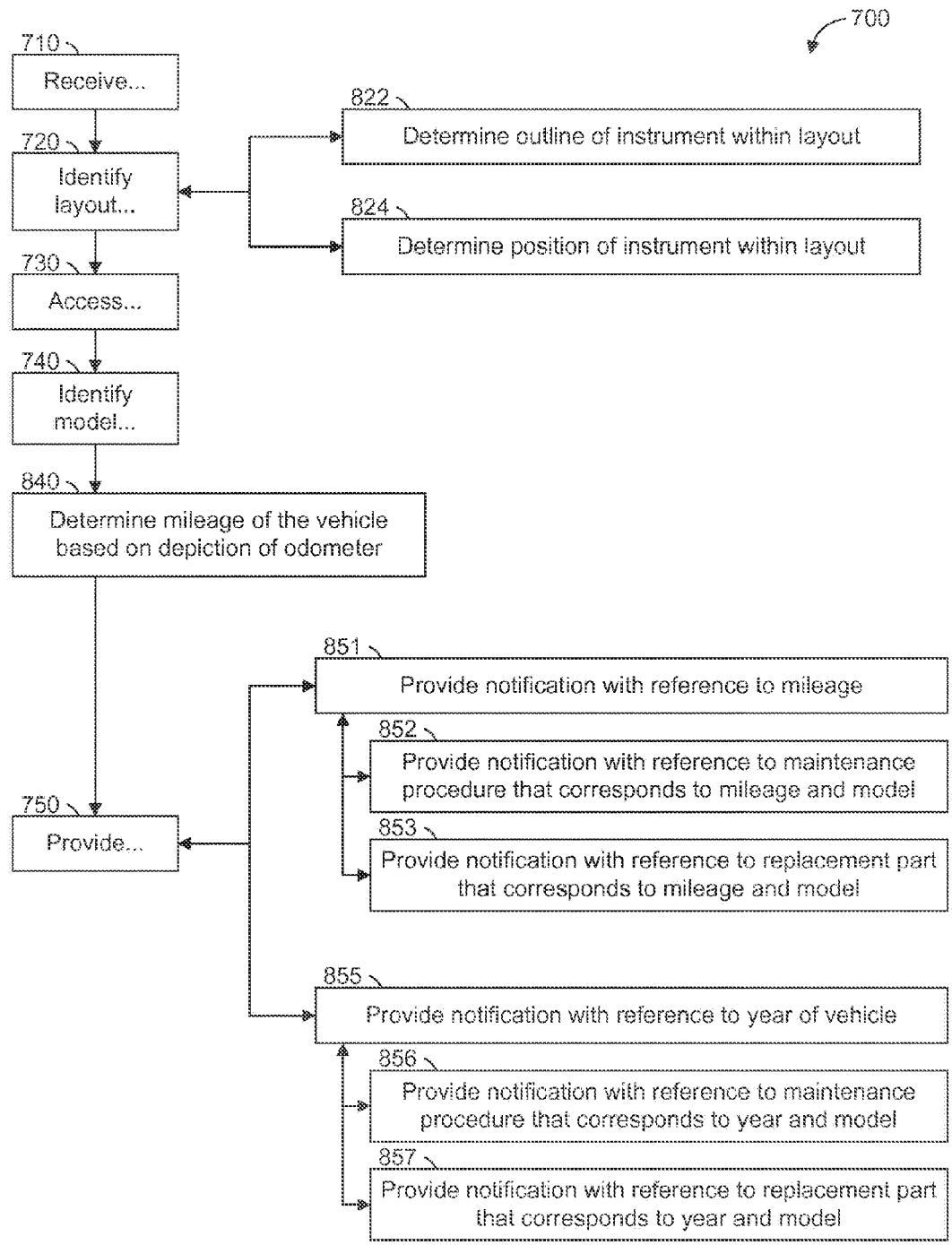
Figure 9:
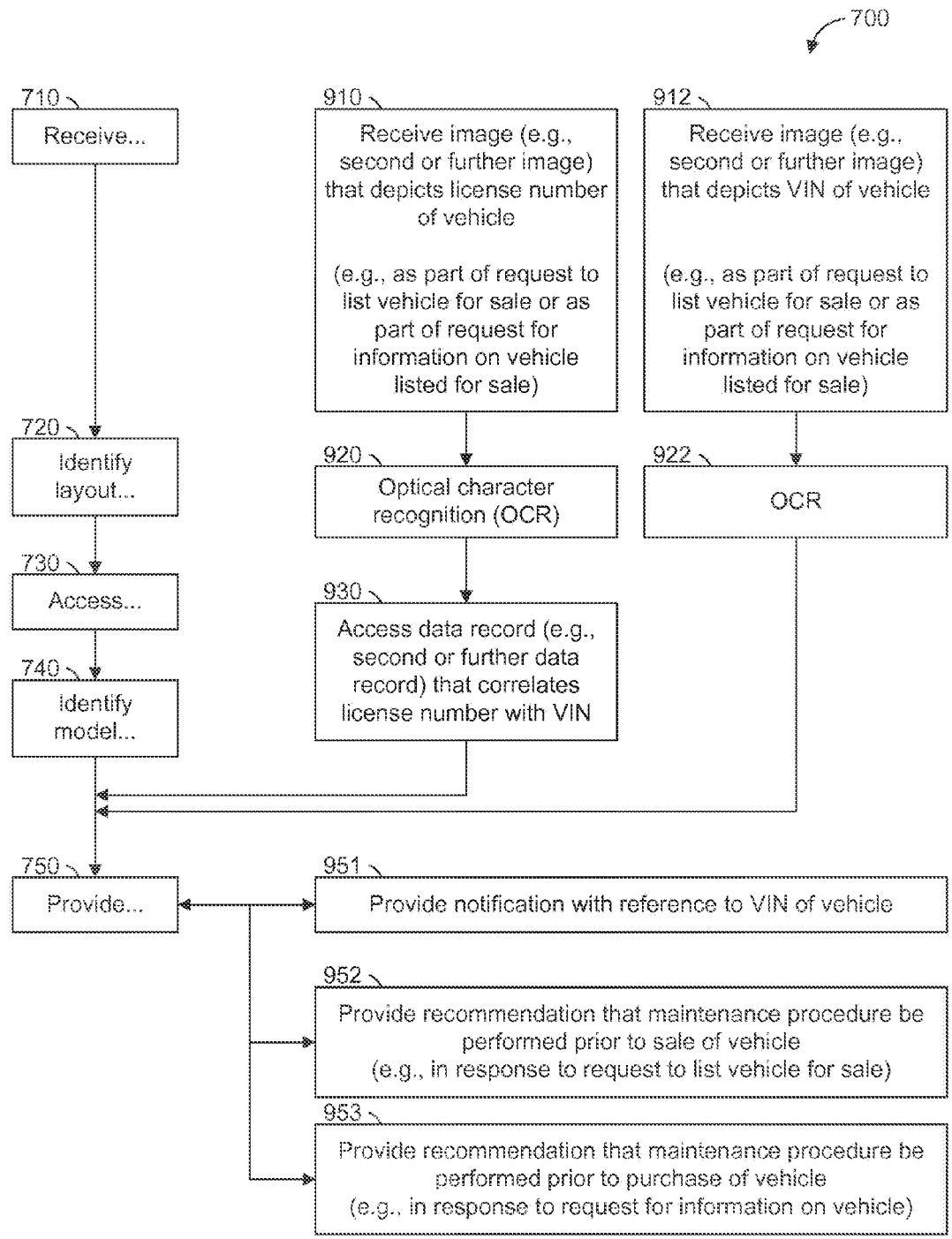

FIG. 7-9 are flowcharts illustrating operations of the vehicle identification machine 110 in performing a method 700 of identifying a model (e.g., model 420) of the vehicle 140 based on the image 300, according to some example embodiments. Operations in the method 700 may be performed by the vehicle identification machine 110, using modules described above with respect to FIG. 2. As shown in FIG. 7, the method 700 includes operations 710, 720, 730, 740, and 750.

In operation 710, the reception module 210 receives the image 300. The image 300 may be received from a device (e.g., device 130 or device 150) via the network 190, and the image 300 may be received as part of a request. For example, the image 300 may be received from the device 150 as part of a request submitted by the user 152 (e.g., a seller of the vehicle 140) to list the vehicle 140 for sale. As another example, the image 300 may be received from the device 130 as part of a request submitted by the user 132 (e.g., a potential buyer of the vehicle 140) for information on the vehicle 140 that is listed for sale. As noted above, the image 300 may depict the layout 390 of instrumentation within the dashboard 305 of the vehicle 140.

In operation 720, the dashboard module 220 identifies the layout 390 of instrumentation depicted in the image 300. As noted above, the layout 390 depicted in the image 300 may match (e.g., identically or within a threshold degree of similarity) the layout 410 that is represented (e.g., by inclusion) in the data record 400. The dashboard module 220 may perform operation 720 by processing the image 300 that depicts the dashboard 305 of the vehicle 140. Further details of operation 720 are discussed below with respect to FIG. 8.

In operation 730, the correlation module 230 accesses the data record 400 from the database 115. As noted above, the data record 400 correlates the model 420 of the vehicle 140 with the layout 410 that may match (e.g., perfectly or within a threshold degree of similarity) the layout 390 depicted in the image 300. Hence, the data record 400 may correlate the model 420 with the layout 390, the layout 410, or both.

In operation 740, the identification module 240 identifies the model 420 of the vehicle 140 based on the data record 400 accessed in operation 730. In particular, operation 740 may be performed based on the data record 400 that correlates the model 420 of the vehicle 140 with the layout 390 depicted in the image 300.

In operation 750, the notification module 250 provides a notification (e.g., a message, alert, warning, recommendation, suggestion, advertisement, tutorial, or encouragement) that references the vehicle 140, references the identified model 420 of the vehicle 140, or both. Operation 750 may be performed in response to a request that includes the image 300 received in operation 710. For example, operation 750 may be performed in response to a request submitted by the user 152 to list the vehicle 140 for sale. As another example, operation 750 may be performed in response to a request submitted by the user 132 for information regarding the vehicle 140 listed for sale. According to various example embodiments, performance of operation 750 may include providing the notification via email, text message, voice message (e.g., computer-generated voicemail), dialog box within a user interface, pop-up widget or alert on a smartphone, or any suitable combination thereof.

As shown in FIG. 8, the method 700 may include one or more of operations 822, 824, 840, 851, 852, 853, 855, 856, and 857. One or more of operations 822 and 824 may be performed as part (e.g., a precursor task, a subroutine, or a portion) of operation 720, in which the dashboard module 220 identifies the layout 390 (e.g., as a perfect or substantial match to the layout 410).

In operation 822, the dashboard module 220 processes the image 300 by determining an outline of an instrument (e.g., instrument 320) within the layout 390 of instrumentation. In example embodiments that include operation 822, operation 740 may be performed (e.g., by the identification module 240) based on the outline of the instrument, as determined in operation 822. For example, the identification module 240 may determine that the outline of the instrument matches an outline modeled in the layout 410 stored within the data record 400 (e.g., matches identically, or within a threshold degree of similarity, as indicated by a calculated probability that the stored outline matches the determined outline). Thus, the identification module 240 may identify the model 420 of the vehicle 140 based on the instrument having an outline that matches an outline represented in the layout 410.

In operation 824, the dashboard module 220 processes the image 300 by determining a position (e.g., position 412) of an instrument (e.g., instrument 320) within the layout 390 of instrumentation. As noted above, the position of the instrument may be relative to one or more other instruments (e.g., instruments 330 and 360) within the layout 390. In example embodiments that include operation 824, operation 740 may be performed (e.g., by the identification module 240) based on the position of the instrument, as determined in operation 824. For example, the identification module 240 may determine that the position of the instrument matches the position 412 stored in the data record 400 (e.g., matches identically, or within a threshold degree of similarity, as indicated by a calculated probability that the position 412 matches the position determined in operation 824). Thus, the identification module 240 may identify the model 420 of the vehicle 140 based on the instrument being in the position 412 within the layout 390 of instrumentation.

In some example embodiments, the instrument 360 in the dashboard 305 is an odometer (e.g., an instrument that measures or indicates distance traveled by the vehicle 140). As shown in FIG. 8, operation 840 may be performed prior to operation 750, in which the notification module 250 provides the notification that references the vehicle 140, references the model 420 of the vehicle 140, or references both. In operation 840, the dashboard module 220 determines a distance traveled (e.g., a mileage or count of kilometers driven or flown) by the vehicle 140. The distance traveled may be determined based on the image 300 that depicts the odometer (e.g., instrument 360). For example, the dashboard module 220 may perform one or more optical character recognition (OCR) operations and thereby read the distance traveled, as depicted in the image 300. In example embodiments that include operation 840, operation 750 may be performed (e.g., by the notification module 250) based on the distance traveled, as determined in operation 840. For example, operation 750 may include providing a notification with a reference to a mileage determined based on the image 300 that depicts the odometer (e.g., instrument 360).

As shown in FIG. 8, one or more of operations 851 and 855 may be performed as part (e.g., a precursor task, a subroutine, or a portion) of operation 750, in which the notification module 250 provides the notification, as described above with respect to FIG. 7. In operation 851, the notification module 250 provides the notification with a reference to the distance traveled (e.g., mileage) of the vehicle 140), as determined in operation 840. For example, the notification may include the distance traveled. As another example, the notification may include a summarized or estimated version of the distance traveled (e.g., truncated, rounded up to the nearest thousand miles or kilometers, or rounded down to the nearest thousand miles or kilometers).

One or more of operations 852 and 853 may be performed as part of operation 851. In operation 852, the notification module 250 provides the notification with a reference to a maintenance procedure that is applicable to the vehicle 140 (e.g., an inspection of all or part of the vehicle 140, a replacement of one or more parts of the vehicle 140, an upgrade of one or more parts of the vehicle 140, a retrofit of one or more parts of the vehicle 140, or any suitable combination thereof). In some example embodiments, the maintenance procedure also corresponds to the distance traveled (e.g., mileage), as determined in operation 840. In certain example embodiments, the maintenance procedure also corresponds to the model 420 of the vehicle 140, as identified in operation 740. In hybrid example embodiments, the maintenance procedure corresponds to the distance traveled (e.g., mileage) and to the model 420 of the vehicle 140. According to various example embodiments, in performing this operation, the notification module 250 accesses information describing the maintenance procedure from a third-party server e.g., a website or database maintained by the manufacturer of the vehicle 140) and identifies the maintenance procedure based on the model 420 of the vehicle 140, the year 430 of the vehicle 140, the distance traveled (e.g., as determined in operation 840), or any suitable combination thereof.

In operation 853, the notification module 250 provides the notification with a reference to a replaceable part (e.g., a replacement part) of the vehicle 140 (e.g., a component or subassembly within the vehicle 140 that is replaceable, for example, when damaged or worn out). In some example embodiments, the replaceable part also corresponds to the distance traveled (e.g., mileage), as determined in operation 840. In certain example embodiments, the replaceable part also corresponds to the model 420 of the vehicle 140, as identified in operation 740. In hybrid example embodiments, the replaceable part corresponds to the distance traveled (e.g., mileage) and to the model 420 of the vehicle 140. According to various example embodiments, in performing this operation, the notification module 250 accesses information describing the replaceable part from a third-party server (e.g., a website or database maintained by the manufacturer of the vehicle 140) and identifies the replaceable part based on the model 420 of the vehicle 140, the year 430 of the vehicle 140, the distance traveled (e.g., as determined in operation 840), or any suitable combination thereof.

In operation 855, the notification module 250 provides the notification with a reference to the year 430 of the vehicle 140. As noted above, the year 430 may be correlated with the layout 410 of instrumentation within the data record 400, as accessed (e.g., by the correlation module 230) in operation 730. For example, the notification may include the year 430 of the vehicle 140. As another example, the notification may include a range of years that include (e.g., encompass or span) the year 430.

One or more of operations 856 and 857 may be performed as part of operation 855. In operation 856, the notification module 250 provides the notification with a reference to a maintenance procedure that is applicable to vehicles that correspond to the year 430 of the vehicle 140 (e.g., an inspection of all or part of the vehicle 140, a replacement of one or more parts of the vehicle 140, an upgrade of one or more parts of the vehicle 140, a retrofit of one or more parts of the vehicle 140, or any suitable combination thereof). In some example embodiments, the maintenance procedure also corresponds to the distance traveled (e.g., mileage), as determined in operation 840. In certain example embodiments, the maintenance procedure also corresponds to the model 420 of the vehicle 140, as identified in operation 740. In hybrid example embodiments, the maintenance procedure corresponds to the year 430, the distance traveled (e.g., mileage), the model 420 of the vehicle 140, or any suitable combination thereof. According to various example embodiments, in performing this operation, the notification module 250 accesses information describing the maintenance procedure from a third-party server (e.g., a website or database maintained by the manufacturer of the vehicle 140) and identifies the maintenance procedure based on the model 420 of the vehicle 140, the year 430 of the vehicle 140, the distance traveled (e.g., as determined in operation 840), or any suitable combination thereof.

In operation 857, the notification module 250 provides the notification with a reference to a replaceable part (e.g., a replacement part) for vehicles that correspond to the year 430 of the vehicle 140 (e.g., a component or subassembly within the vehicle 140 that is replaceable, for example, when damaged or worn out). In some example embodiments, the replaceable part also corresponds to the distance traveled (e.g., mileage), as determined in operation 840. In certain example embodiments, the replaceable part also corresponds to the model 420 of the vehicle 140, as identified in operation 740. In hybrid example embodiments, the replaceable part corresponds to the year 430, the distance traveled (e.g., mileage), the model 420 of the vehicle 140, or any suitable combination thereof. According to various example embodiments, in performing this operation, the notification module 250 accesses information describing the replaceable part from a third-party server (e.g., a website or database maintained by the manufacturer of the vehicle 140) and identifies the replaceable part based on the model 420 of the vehicle 140, the year 430 of the vehicle 140, the distance traveled (e.g., as determined in operation 840), or any suitable combination thereof.

As shown in FIG. 9, the method 700 may include one or more of operations 910, 920, 930, 951, 952, and 953. Certain example embodiments of the method 700 may include one or more of operations 912, 922, 951, 952, and 953.

In operation 910, the reception module 210 receives the image 500 (e.g., a further image). The image 500 may be received from a device (e.g., device 130 or device 150) via the network 190, and the image 500 may be received as part of a request. For example, the image 500 may be received from the device 150 as part of a request submitted by the user 152 (e.g., a seller of the vehicle 140) to list the vehicle 140 for sale. As another example, the image 500 may be received from the device 130 as part of a request submitted by the user 132 (e.g., a potential buyer of the vehicle 140) for information on the vehicle 140 that is listed for sale. As noted above, the image 500 may depict the license number 502 of the vehicle 140.

In example embodiments that include operation 910, operation 920 may be performed after operation 910. In operation 920, the dashboard module 220 performs one or more OCR operations and thereby identifies (e.g., extracts or reads) the license number 502 of the vehicle 140, as depicted in the image 500.

In example embodiments that include operation 920, operation 930 may perform after operation 920. In operation 930, the correlation module 230 accesses the data record 600 from the database 115. As noted above, the data record 600 correlates the VIN 620 of the vehicle 140 with the license number 610 that may match (e.g., identically or precisely) the license number 502 depicted in the image 500. Hence, the data record 600 may correlate the VIN 620 with the license number 502, the license number 610, or both.

In certain example embodiments, the method 700 includes one or more of operations 912, 922, 951, 952, and 953. In operation 912, the reception module 210 receives the image 550 (e.g., a further image). The image 550 may be received from a device (e.g., device 130 or device 150) via the network 190, and the image 550 may be received as part of a request. For example, the image 550 may be received from the device 150 as part of a request submitted by the user 152 (e.g., a seller of the vehicle 140) to list the vehicle 140 for sale. As another example, the image 550 may be received from the device 130 as part of a request submitted by the user 132 (e.g., a potential buyer of the vehicle 140) for information on the vehicle 140 that is listed for sale. As noted above, the image 550 may depict the VIN 552 of the vehicle 140.

In example embodiments that include operation 912, operation 922 may be performed after operation 912. In operation 922, the dashboard module 220 performs one or more OCR operations and thereby identifies (e.g., extracts or reads) the VIN 552 of the vehicle 140, as depicted in the image 500.

Where the VIN 552 is known (e.g., from the license number 502 appearing in the image 500, or from the image 550), the VIN 552 may be referenced in the notification provided in operation 750. In example embodiments that include one or more of operations 910, 912, 920, 922, or 930, operation 951 may be performed as part (e.g., a precursor task, a subroutine, or a portion) of operation 750, in which the notification module 250 provides the notification that references the vehicle 140, references the identified model 420 of the vehicle 140, or both.

In operation 951, the notification module 250 provides the notification with a reference to the VIN 552 of the vehicle 140, based on the data record 600. For example, the notification may include the VIN 552 of the vehicle 140. As another example, the notification may include a statement that the vehicle 140 has been identified by its VIN 552.

In example embodiments in which operation 710 is performed as part of receiving a request to list the vehicle 140 for sale, operation 952 may be performed as part of operation 750. In operation 952, the notification module 250 provides a recommendation that a maintenance procedure applicable to the vehicle 140 be performed prior to a sale of the vehicle 140. The notification module 250, in performing operation 952, may access information describing the maintenance procedure from a third-party server (e.g., a website or database maintained by the manufacturer of the vehicle 140). According to various example embodiments, the maintenance procedure may include an inspection of all or part of the vehicle 140, a replacement of one or more parts of the vehicle 140, an upgrade of one or more parts of the vehicle 140, a retrofit of one or more parts of the vehicle 140, or any suitable combination thereof. For example, such a recommendation may be provided in response to a request submitted by the user 152 (e.g., a seller of the vehicle 140) that the vehicle 140 be listed as being available for sale (e.g., on the network-based system 105).

In example embodiments in which operation 710 is performed as part of receiving a request for information regarding the vehicle 140 being listed for sale, operation 953 may be performed as part of operation 750. In operation 953, the notification module 250 provides a recommendation that a maintenance procedure applicable to the vehicle 140 be performed prior to a purchase of the vehicle 140. The notification module 250, in performing operation 952, may access information describing the maintenance procedure from a third-party server (e.g., a website or database maintained by the manufacturer of the vehicle 140). According to various example embodiments, the maintenance procedure may include an inspection of all or part of the vehicle 140, a replacement of one or more parts of the vehicle 140, an upgrade of one or more parts of the vehicle 140, a retrofit of one or more parts of the vehicle 140, or any suitable combination thereof. For example, such a recommendation may be provided in response to a request submitted by the user 132 (e.g., a potential buyer of the vehicle 140) for information regarding the vehicle 140 listed as being available for sale (e.g., on the network-based system 105).

According to various example embodiments, one or more of the methodologies described herein may facilitate identification of a model (e.g., model 420) of a vehicle (e.g., vehicle 140), a year of the vehicle, the vehicle itself, or any suitable combination thereof. Moreover, one or more of the methodologies described herein may facilitate identification of one or more maintenance procedures or replaceable parts that correspond to the vehicle. Hence, one or more the methodologies described herein may facilitate provision of one or more messages, alerts, warnings, recommendations, suggestions, advertisements, tutorials, or encouragements regarding the vehicle to one or more users.

When these effects are considered in aggregate, one or more of the methodologies described herein may obviate a need for certain efforts or resources that otherwise would be involved in identifying a vehicle, its year, its model, or any suitable combination thereof. Efforts expended by a user in listing a vehicle for sale or in obtaining information regarding a vehicle for sale may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 10:
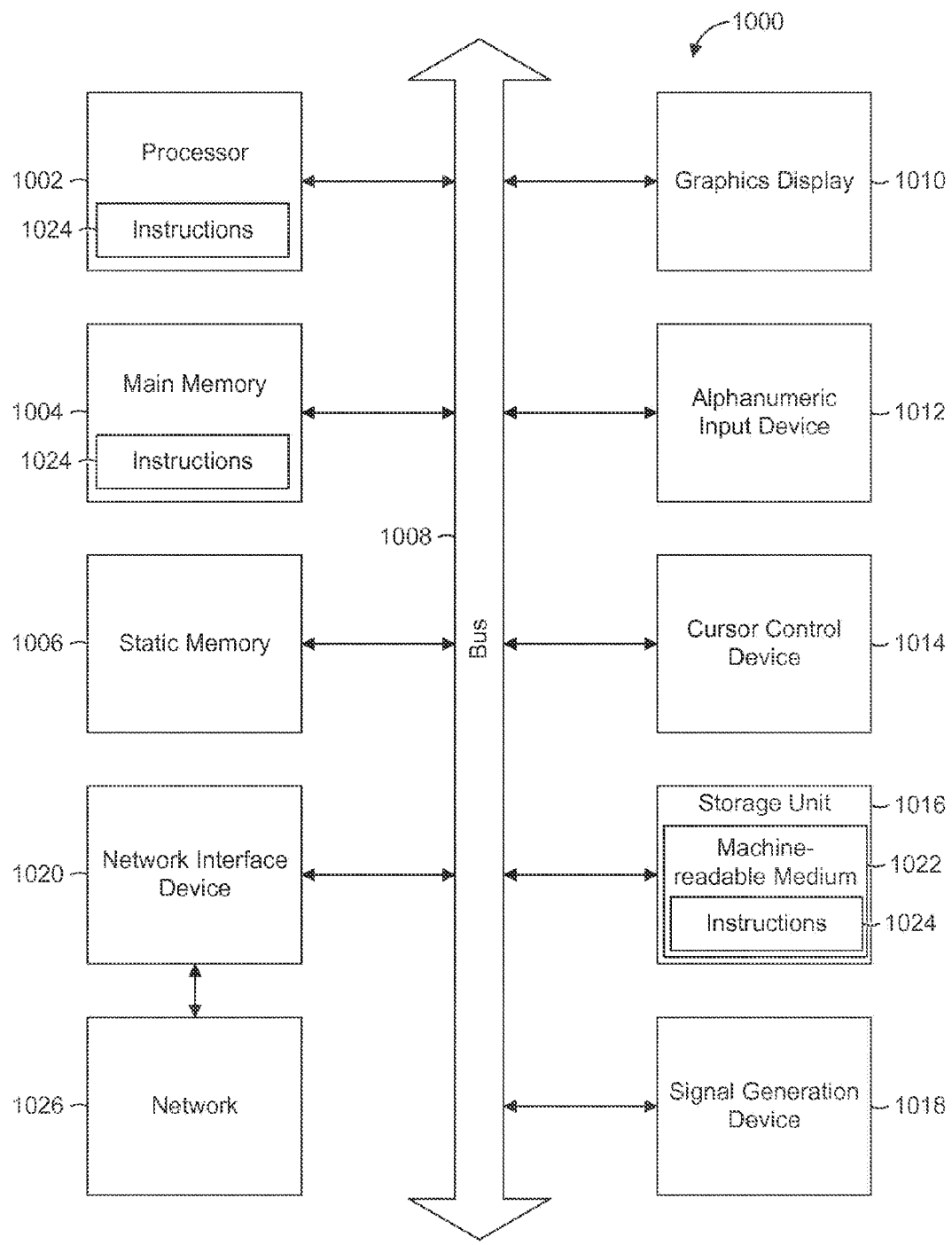
FIG. 10 is a block diagram illustrating components of a machine, according to some example embodiments, able to read instructions from a machine-readable medium and perform any one or more of the methodologies discussed herein.

FIG. 10 is a block diagram illustrating components of a machine 1000, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 10 shows a diagrammatic representation of the machine 1000 in the example form of a computer system and within which instructions 1024 (e.g., software, a program, an application, an applet, an app, or other executable code) for causing the machine 1000 to perform any one or more of the methodologies discussed herein may be executed, in whole or in part. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a distributed (e.g., peer-to-peer) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024, sequentially or otherwise, that specify actions to be taken by that machine. Further, while only a single machine is illustrated, the term "machine" shall also be taken to include a collection of machines that individually or jointly execute the instructions 1024 to perform all or part of any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a light emitting diode (LED) display, a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument a storage unit 1016, a signal generation device 1018 (e.g., a speaker), and a network interface device 1020.

The storage unit 1016 includes a machine-readable medium 1022 on which is stored the instructions 1024 embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 190) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 1000), such that the instructions, when executed by one or more processors of the machine (e.g., processor 1002), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm), other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions define various example embodiments of methods, machine-readable media, and systems apparatus) discussed herein:

1. A system comprising:
a reception module configured to receive an image of a dashboard of a vehicle, the image depicting a layout of instrumentation within the dashboard of the vehicle;
a dashboard module configured to identify the layout of instrumentation depicted in the image by processing the image of the dashboard of the vehicle;
a correlation module configured to access a data record that correlates a model of the vehicle with the layout of instrumentation within the dashboard of the vehicle;
a processor configured by an identification module to identify the model of the vehicle based on the data record that correlates the model of the vehicle with the layout of instrumentation depicted in the image; and
a notification module configured to provide a notification that references the vehicle and the identified model of the vehicle.

2. The system of description 1, wherein:
the dashboard module is configured to process the image by determining a position of an instrument within the layout of instrumentation; and
the identification module configures the processor to identify the layout of instrumentation based on the position of the instrument within the layout of instrumentation.

3. The system of description 1, wherein:
the image depicts an instrument in a position within the layout of instrumentation;
the data record correlates the model of the vehicle with the position of the instrument within the layout of instrumentation; and
the identification module configures the processor to identify the model of the vehicle based on the instrument being in the position within the layout of instrumentation.

4. A method comprising:
receiving an image of a dashboard of a vehicle,
the image depicting a layout of instrumentation within the dashboard of the vehicle; identifying the layout of instrumentation depicted in the image by processing the image of the dashboard of the vehicle;
accessing a data record that correlates a model of the vehicle with the layout of instrumentation within the dashboard of the vehicle;
identifying the model of the vehicle based on the data record that correlates the model of the vehicle with the layout of instrumentation depicted in the image, the identifying of the model being performed by a processor of a machine; and
providing a notification that references the vehicle and the identified model of the vehicle.

5. The method of description 4, wherein:
the processing of the image includes determining an outline of an instrument within the layout of instrumentation; and
the identifying of the layout of instrumentation is based on the outline of the instrument.

6. The method of description 4 or description 5, wherein:
the processing of the image includes determining a position of an instrument within the layout of instrumentation; and
the identifying of the layout of instrumentation is based on the position of the instrument within the layout of instrumentation.

7. The method of description 4 or description 5, wherein:
the image depicts an instrument in a position within the layout of instrumentation;
the data record correlates the model of the vehicle with the position of the instrument within the layout of instrumentation; and
the identifying of the model of the vehicle is based on the instrument being in the position within the layout of instrumentation.

8. The method of description 7, wherein:
the instrument is selected from a group consisting of a speedometer, an odometer, a tachometer, a fuel gauge, a coolant temperature gauge, an oil pressure gauge, a headlight indicator, a turn signal indicator, a transmission indicator, and an open door indicator.

9. The method of any of descriptions 4-8, wherein:
the image depicts an odometer within the dashboard of the vehicle;
the method further comprises determining a mileage of the vehicle based on the image that depicts the odometer within the dashboard of the vehicle; and
the providing of the notification provides the notification with a reference to the mileage determined based on the image that depicts the odometer.

10. The method of description 9, wherein:
the providing of the notification provides the notification with a reference to a maintenance procedure that corresponds to the mileage and the model of the vehicle.

11. The method of description 9 or description 10, wherein:
the providing of the notification provides the notification with a reference to a replaceable part that corresponds to the mileage and the model of the vehicle.

12. The method of any of descriptions 4-11, wherein:
the data record correlates a year of the vehicle with the layout of instrumentation; and the providing of the notification provides the notification with a reference to the year of the vehicle.

13. The method of description 12, wherein:
the providing of the notification provides the notification with a reference to a maintenance procedure that corresponds to the year and the model of the vehicle.

14. The method of description 12 or description 13, wherein:
the providing of the notification provides the notification with a reference to a replaceable part that corresponds to the year and the model of the vehicle.

15. The method of any of descriptions 4-14 further comprising:
receiving a further image that depicts a license number of the vehicle; and accessing a further data record that correlates the license number of the vehicle with a vehicle identification number of the vehicle; and wherein
the providing of the notification provides the notification with a reference to the vehicle identification number of the vehicle.

16. The method of any of descriptions 4-14 further comprising:
receiving a further image that depicts a vehicle identification number of the vehicle; and wherein
the providing of the notification provides the notification with a reference to the vehicle identification number of the vehicle.

17. The method of any of descriptions 4-16, wherein:
the image is received as part of a request that the vehicle be listed for sale; and
the providing of the notification provides a recommendation that a maintenance procedure be performed prior to a sale of the vehicle.

18. The method of any of descriptions 4-16, wherein:
the image received as part of a request for information on the vehicle being listed for sale; and
the providing of the notification provides a recommendation that a maintenance procedure be performed prior to a purchase of the vehicle.

19. A non-transitory machine-readable storage medium comprising instructions that, when executed by one or more processors of a machine, cause the machine to perform operations comprising:
receiving an image of a dashboard of a vehicle,
the image depicting a layout of instrumentation within the dashboard of the vehicle;
identifying the layout of instrumentation depicted in the image by processing the image of the dashboard of the vehicle;
accessing a data record that correlates a model of the vehicle with the layout of instrumentation within the dashboard of the vehicle;
identifying the model of the vehicle based on the data record that correlates the model of the vehicle with the layout of instrumentation depicted in the image,
the identifying of the model being performed by the one or more processors of the machine; and
providing a notification that references the vehicle and the identified model of the vehicle.

20. The non-transitory machine-readable storage medium of description 19, wherein:
the processing of the image includes determining an outline of an instrument within the layout of instrumentation; and
the identifying of the layout of instrumentation is based on the outline of the instrument.

What is claimed is:
1. A system comprising:
one or more processors; and
a machine-readable storage device comprising instructions that, when executed by the one or more processors, cause the one or more processors to perform operations comprising:
receiving one or more features of an instrument panel of a vehicle, the instrument panel having a first instrument and a second instrument in a layout of instrumentation;
modeling the layout of instrumentation by representing the first instrument and the second instrument as a first layout model, the first layout model having a first outline corresponding to the first instrument, a second outline corresponding to the second instrument, and a relative position of the first outline and the second outline, and determining a visible interior edge of an instrument and a visible exterior edge of an instrument for one or more of the first outline or the second outline;
determining a correspondence between the first layout model and a second layout model; and
based on the correspondence between the first layout model and the second layout model, providing a notification identifying a vehicle model corresponding to the second layout model as a vehicle model for the first layout model.

2. The system of claim 1, wherein the operations further comprise:
accessing a data record that correlates a model of the vehicle with the layout of instrumentation within a dashboard of the vehicle.

3. The system of claim 1, wherein, for one or more of the first outline or the second outline, modeling the layout of instrumentation further comprises:
determining a visible marking of an instrument.

4. The system of claim 3, wherein the visible marking is selected from a group consisting of text, one or more numbers, one or more symbols, and a pattern of marks.

5. The system of claim 1, wherein the notification is provided in response to receiving a request for information regarding the vehicle, wherein the vehicle is listed for sale on a network-based system.

6. A method, comprising:
receiving one or more features of an instrument panel of a vehicle, the instrument panel having a first instrument and a second instrument in a layout of instrumentation;
modeling, by one or more processors, the layout of instrumentation by representing the first instrument and the second instrument as a first layout model, the first layout model having a first outline corresponding to the first instrument, a second outline corresponding to the second instrument, and a relative position of the first outline and the second outline, and determining a visible interior edge of an instrument and a visible exterior edge of an instrument for one or more of the first outline or the second outline;
determining, by the one or more processors, a correspondence between the first layout model and a second layout model; and
based on the correspondence between the first layout model and the second layout model, providing a notification identifying a vehicle model corresponding to the second layout model as a vehicle model for the first layout model.

7. The method of claim 6 further comprising:
accessing a data record that correlates a model of the vehicle with the layout of instrumentation within a dashboard of the vehicle.

8. The method of claim 6, wherein, for one or more of the first outline or the second outline, modeling the layout of instrumentation further comprises:

determining a visible marking of an instrument.

9. The method of claim 6, wherein the visible marking is selected from a group consisting of text, one or more numbers, one or more symbols, and a pattern of marks.

10. The method of claim 6, wherein the notification is provided in response to receiving a request for information regarding the vehicle, wherein the vehicle is listed for sale on a network-based system.

11. A machine-readable storage device comprising instructions that, when executed by one or more processors of a machine, cause the machine to perform operations comprising:

receiving one or more features of an instrument panel of a vehicle, the instrument panel having a first instrument and a second instrument in a layout of instrumentation;

modeling the layout of instrumentation by representing the first instrument and the second instrument as a first layout model, the first layout model having a first outline corresponding to the first instrument, a second outline corresponding to the second instrument, and a relative position of the first outline and the second outline, and determining a visible interior edge of an instrument and a visible exterior edge of an instrument for one or more of the first outline or the second outline;

determining a correspondence between the first layout model and a second layout model; and based on the correspondence between the first layout model and the second layout model, providing a notification identifying a vehicle model corresponding to the second layout model as a vehicle model for the first layout model.

12. The non-transitory machine-readable storage medium of claim 11, wherein the operations further comprise:

accessing a data record that correlates a model of the vehicle with the layout of instrumentation within a dashboard of the vehicle.

13. The non-transitory machine-readable storage medium of claim 11, wherein, for one or more of the first outline or the second outline, modeling the layout of instrumentation further comprises:

determining a visible marking of an instrument.

14. The non-transitory machine-readable storage medium of claim 11, wherein the notification is provided in response to receiving a request for information regarding the vehicle, wherein the vehicle is listed for sale on a network-based system.

* * * * *